US008396588B2

(12) United States Patent
Senger et al.

(10) Patent No.: US 8,396,588 B2
(45) Date of Patent: Mar. 12, 2013

(54) CONVEYOR SAFETY CONTROL

(75) Inventors: Alois Senger, Gresten (AT); Bernard Kamenicky, Altlengbach (AT)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 13/264,431

(22) PCT Filed: Apr. 20, 2009

(86) PCT No.: PCT/EP2009/002874

§ 371 (c)(1), (2), (4) Date: Jan. 24, 2012

(87) PCT Pub. No.: WO2010/012629

PCT Pub. Date: Oct. 28, 2010

(65) Prior Publication Data

US 2012/0283870 A1 Nov. 8, 2012

(51) Int. Cl.
*G06F 7/00* (2006.01)

(52) U.S. Cl. ....................................................... 700/230

(58) Field of Classification Search ................... 700/230
See application file for complete search history.

(56) References Cited

U.S. PATENT DOCUMENTS 3,580,376 A 5/1971 Loshbough
4,863,006 A 9/1989 Kotkata et al.
6,267,219 B1 7/2001 Spannhake et al.
6,666,319 B2 12/2003 Balzer-Apke et al.
2012/0175223 A1* 7/2012 Breen et al. ................ 198/459.8
2012/0175225 A1* 7/2012 Breen et al. ................... 198/571

OTHER PUBLICATIONS

International Search Report and Written Opinion of the International Searching Authority for International Application No. PCT/EP2009/002874 mailed Dec. 14, 2009.

* cited by examiner

*Primary Examiner* — Ramya Burgess
(74) *Attorney, Agent, or Firm* — Carlson, Gaskey & Olds PC

(57) ABSTRACT

A conveyor system has a plurality of sensors coupled to a computer system, the computer system being programmed to check a number of safety functions greater than the number of sensors. A method of controlling the safety function of the conveyor comprises providing signals from a plurality of sensors disposed in relation to the conveyor to a computer system; operating the conveyor in a learn mode; during operation in the learn mode determining in the computer system the relationship between the sensor output signals and pre-stored logic in the computer system which describes the physical geometry of the possible conveyor types and permissible operating characteristics thereof and determining the relationship between the sensor output signals to establish the safety integrity of the sensors, and storing sensor signal patterns as a reference pattern; and subsequently operating the conveyor in a run mode in which safety functions are monitored; and during the run mode comparing in the computer system the pattern of sensor signals with the reference pattern and with the pre-stored logic so as to establish the safety integrity of the sensors, of the computer system and of the operation of the conveyor.

15 Claims, 8 Drawing Sheets

CONVEYOR SAFETY CONTROL

This invention relates to improvements in the safety control of conveyor apparatus, and has particular, though not exclusive, application in passenger conveyors, such as escalators and moving walkways and pavements.

Known conveyors are conventionally fitted for safety purposes with a number of sensors, typically switches, for detecting specific dangerous events, such as a foreign object entering a handrail entry or an exit comb, and a control circuit is arranged to take appropriate action, typically stopping the conveyor, when the specific event is detected by the sensor. Usually these sensors are dedicated to only a single safety function. The sensors may be individually wired back to the controller, or they may communicate via a common bus arrangement. Conventionally, normally-closed switches are connected in series to form a so-called "safety chain", such that when any switch is opened the chain is broken and the appropriate safety response ensues.

Generally the use of programmed computers in such safety functions has been limited, but the use of computers can bring many well-known advantages, such as savings in cost, and improved monitoring, management and control.

It is an object of the invention to provide safety controls using computers which provide enhanced functionality with a high level of safety integrity.

According to the invention, there is provided a method of controlling the safety function of a conveyor, comprising providing signals from a plurality of sensors disposed in relation to the conveyor to a computer system; operating the conveyor in a learn mode; during operation in the learn mode determining in the computer system the relationship between the sensor output signals and pre-stored logic in the computer system which describes the physical geometry of the possible conveyor types and permissible operating characteristics thereof and determining the relationship between the sensor output signals to establish the safety integrity of the sensors, and storing sensor signal patterns as a reference pattern; and subsequently operating the conveyor in a run mode in which safety functions are monitored; and during the run mode comparing in the computer the pattern of sensor signals with the reference pattern and the pre-stored logic so as to establish the safety integrity of the sensors, of the computer system and of the operation of the conveyor.

The invention, at least in its preferred forms, can by monitoring safety integrity provide for the necessary safety of a conveyor without relying on absolute values of sensor outputs and comparing them with fixed values. Thereby the safety of a complex conveyor can be assured, even in the event that some changes are made to the conveyor.

A distinction over prior processes is that if safety integrity is not established, a safety-related action can be performed, such as stopping the conveyor, even though there might be no sensor output that of itself indicates a failure condition. This clearly leads to an increase in overall safety of operation.

Embodiments of the invention will now be described by way of example and with reference to the accompanying drawings, in which.

Figure 1:
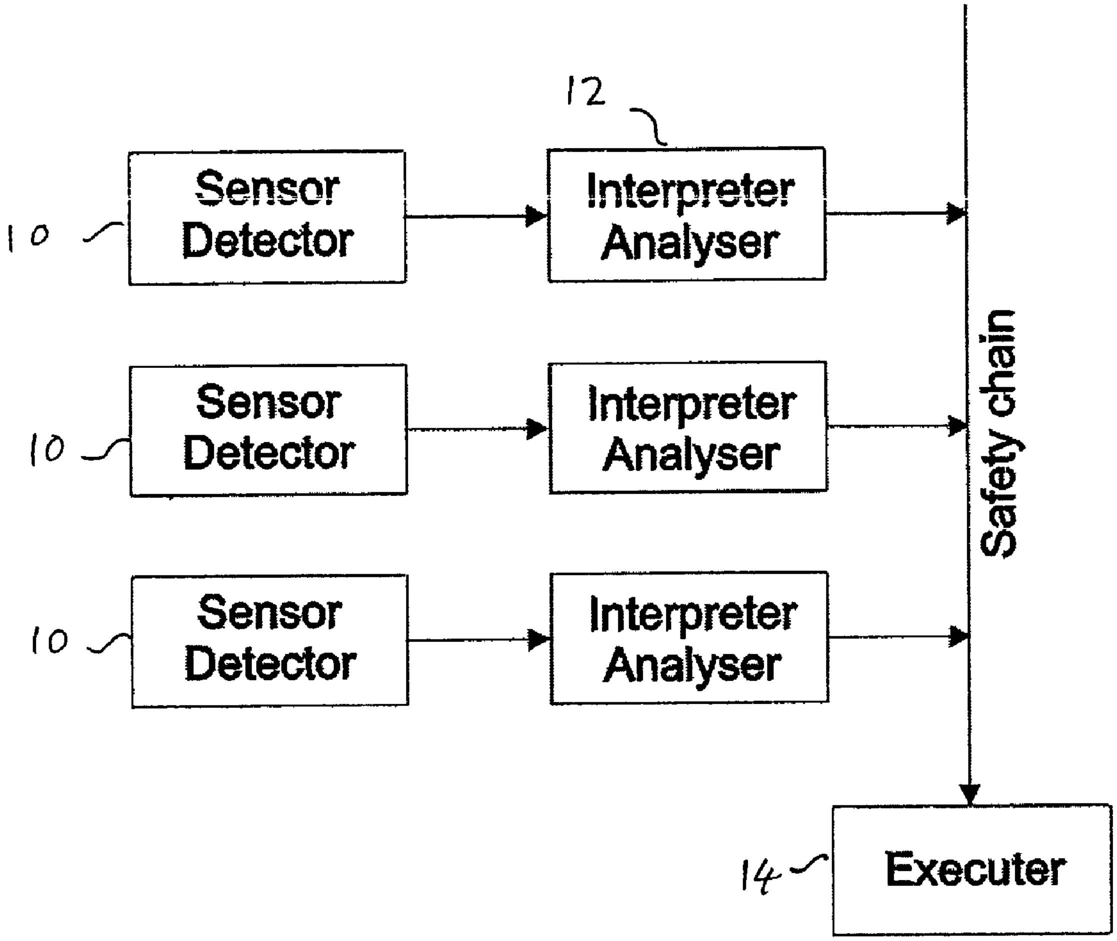
FIG. 1 is a conceptual diagram of a safety control in prior art escalators.

Referring to FIG. 1, a conventional safety system is shown in which each sensor is directed to detecting and protecting against a single fault condition. A number of sensor detectors 10 are deployed where required to detect failures and dangerous conditions. The safety system consists basically of three elements: sensors 10, such as levers, ramps, wipers or light barriers, photosensors, CCDs, hall sensors, etc; an interpreter/analyzer device 12 that interprets the output of the respective sensor 10 and for example opens or closes or interrupts an output, based on the signal from the sensor; and an executer 14, which performs an action, based on the status of the interpreters. Usually the outputs of the interpreters are connected in series to form a safety chain, which leads the system to a fail-safe mode, and usually this is the stopping of the machine. Each sensor/interpreter combination including the interrupting of the safety chain has to provide the safety integrity needed for the dedicated function. Any change in safety integrity during the lifetime of the components cannot be observed.

Figure 2:
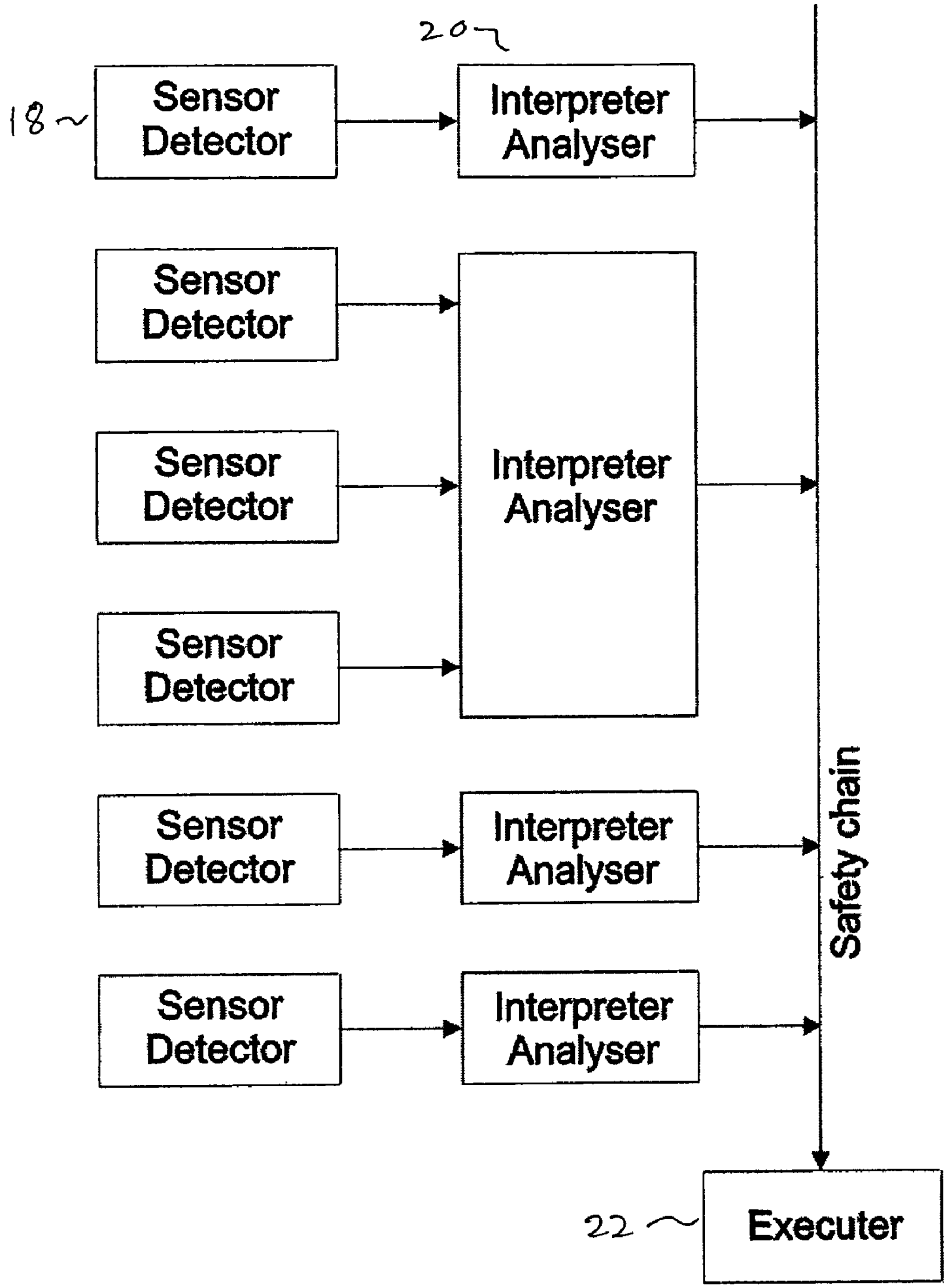
FIG. 2 is a diagram similar to FIG. 1 illustrating certain novel aspects of the invention.

FIG. 2 illustrates aspects of the present invention. In particular several safety functions with different requirements related to the level of safety are interpreted by a common interpreter. Each sensor is not related directly to only one safety function; furthermore a sensor may provide an information status. Furthermore the integrity of the sensor is not a requirement for the integrity of a single safety function. This information is combined with the information status of one or more other sensors. The combined information patterns are interpreted as safe or not safe information patterns, by comparison with a reference information pattern, as well as by comparison with a logic relation which is defined in the computer. Each of the reference patterns may have limited tolerances, and within those tolerances the measured sensor pattern can be interpreted as safe or not safe status. The comparison of the signals received and processed can be used to evaluate the integrity of the sensors, the processing unit (computer), as well as the pattern received from the learn mode. In this way the integrity of the sensors and processing unit can be observed continuously.

Here the safety system consists basically of three elements: sensors 18, interpreters 20, which combine, compare, and differentiate the received sensor signals and derive from these a result; and executer 22, which carries out an action, based on the status of the interpreters. Again usually the outputs of the interpreters are considered to be in series, or are effectively combined using redundant AND logic combinations, which leads the system to a failsafe mode. Usually this is the stopping of the machine, if the executer determines that a safe condition does not exist.

It may be seen that the interpreters 20 may receive the output from more than one sensor. This enables more extensive safety checks to be performed. In accordance with an important aspect of the invention, the interpreters 20 may perform more than one safety function based on the output of more than one sensor. In an example described below, three sensors may be used to protect against an overspeed condition, a missing step, a stretched chain and a reverse motion, for example.

In accordance with another aspect, the interpreters 20 may compare a pattern of sensor outputs with a reference pattern received from the learn mode and a stored logic pattern and physical pattern and carry out a safety function when the pattern does not match. The stored logic determines on its own if the pattern received in the learn mode matches to a possible hardware configuration of the escalators in use by the manufacturer. As mentioned above, the pattern may have tolerance levels built into it. Preferably the pattern to be matched is established, and/or its parameters may be established during a learn run operation phase of the escalator, i.e. a "learn" mode.

Figure 3:
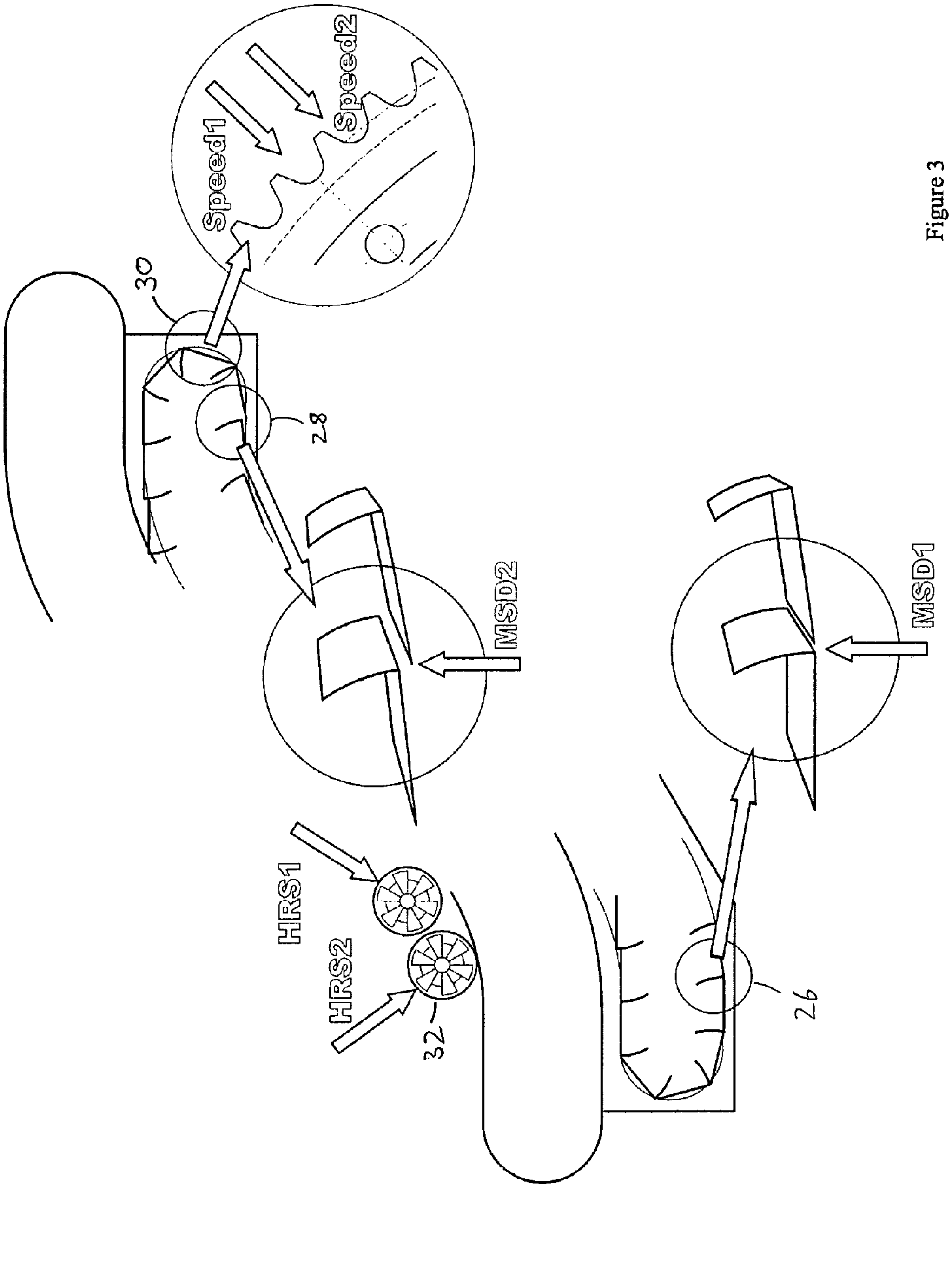
FIG. 3 illustrates a possible arrangement of sensors in an escalator in accordance with the invention.

FIG. 3 shows schematically the possible placement of sensors in an escalator in accordance with the invention.

Step sensors or missing step detectors MSD1 and MSD2 (26, 28) are located adjacent the return run of the escalator, respectively near the bottom and top of the escalator, or in other convenient locations. They may detect any suitable property of the steps, such as the presence of the material, or a pattern applied to the top or bottom of the step, or the gap between the steps or pallets, as shown in FIG. 3. For example the detectors may be inductive or capacitive or may employ optical systems such as a photosensor or light barrier or any kind of optical image processing system, e.g. a CCD sensor. One particularly suitable sensor is an open-collector inductive sensor.

One or two speed sensors SPEED1 and SPEED2 (30) may detect the toothed wheel pitch of the main drive sprocket or an encoder may be applied either to the main drive shaft axle or to the handrail drive axle, using methods known in the art.

Handrail sensors HRS1 and HRS2 (32) may detect movement of the handrails.

All of the sensors may be of various kinds. Inductive, capacitive and optical detectors can be used. In the case that no toothed wheel is used, an optical or mechanical encoder disc can be used.

Whilst two step sensors and two handrail sensors are illustrated in this example, it is possible to have only a single step sensor and/or only a single handrail sensor if a lower safety integrity level can be accepted.

Figure 4:
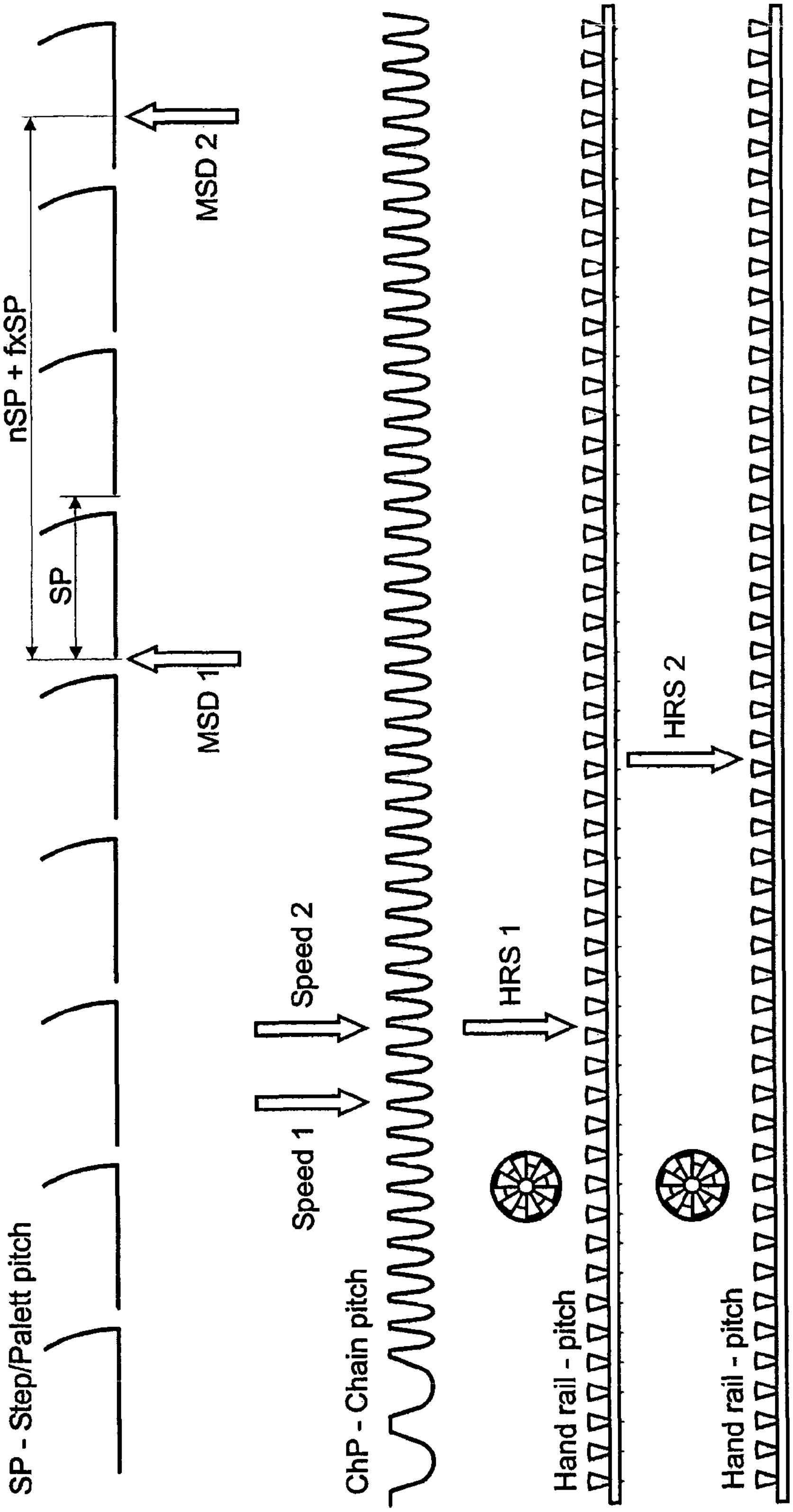
FIG. 4 illustrates a physical pattern in the system detected by sensors.

FIG. 4 shows in simplified linear form the physical pattern of the conveyor, including the location of the sensors of FIG. 3. In the illustrative embodiment the distance between the step detectors 26, 28 is chosen to be a whole number of step lengths plus a fraction f other than a half, such as ⅓ step length as illustrated for detection of direction, as further set out below. The SPEED1 and SPEED2 sensors 30 are shown as adjacent a single drive chain sprocket whilst the HRS1 and HRS2 sensors 32 are shown as adjacent handrail sprockets of respective left and right handrails.

Figure 5:
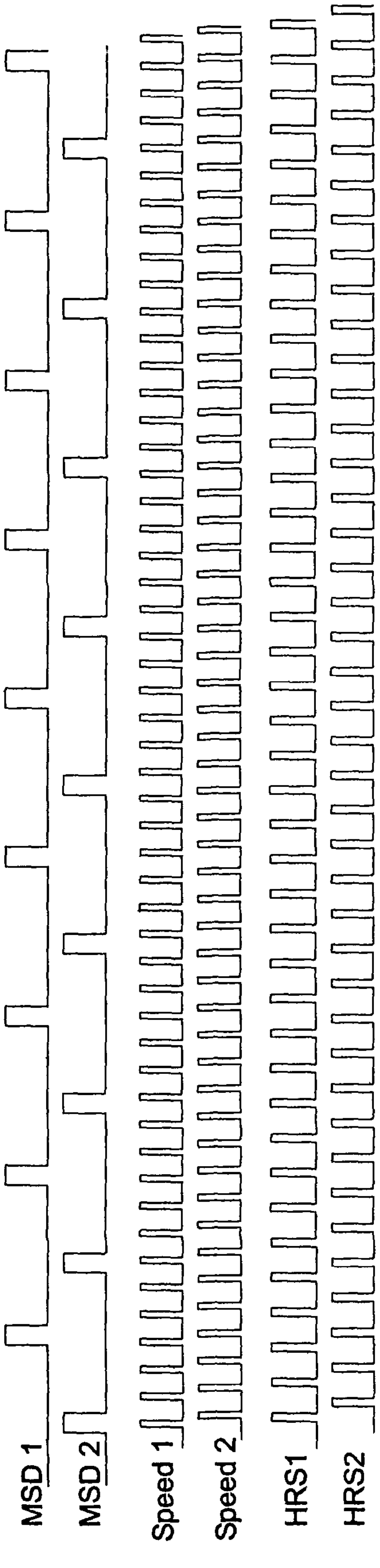
FIG. 5 illustrates a signal pattern of the sensors detecting the physical pattern.

FIG. 5 shows timing diagrams of the signal pattern of the individual sensors described above, which will be further described below.

The following describes some operational characteristics and the relationships of the sensor signals.

Missing Step or Pallet Function

Sensors MSD1 and MSD2 provide an information pattern. In combination with the speed information, which is provided from speed sensors SPEED1 and SPEED2, and the handrail sensors HRS1 and HRS2, a high integrity of the measurement of the step or pallet length can be provided as well as a gap between the steps/pallets can be provided and also an accurate speed of the step band measurement is possible. Even between all the speed sensor information logic pattern such as gear ratios within the physical pattern leads to linear factors between those patterns received, so the whole information received remains relative and does not refer to absolute limits.

Non-Reversal of the Direction Function

By installing the sensors MSD1 and MSD2 at a multiple of a step length plus a fraction of a step length it is possible to detect the sequence of the gaps which can give the information of direction. Also the sensor locations of the SPEED1 and SPEED2 sensors and their relative distance increases the integrity of the detected direction from the MSD sensors and vice versa. This redundancy of the direction information contributes to the safety integrity level.

By combination of the step gap signals with the pulses of the speed information it is possible after e.g. ⅓ of the step length also to identify the direction.

Overspeed Function

In the illustrative embodiment, two or three or up to six sensors give redundant signal frequencies from the several sensors, providing redundant information about changes in speed. Different resolutions of the speed pattern can be used to identify critical accelerations and decelerations without the loss of integrity by the signal redundancy.

Reduction or lengthening of the step chain can also be determined from the MSD1 and MSD2 sensor signals.

A difference in step speed and handrail speed can be detected and further safety actions can be taken.

Figure 6:
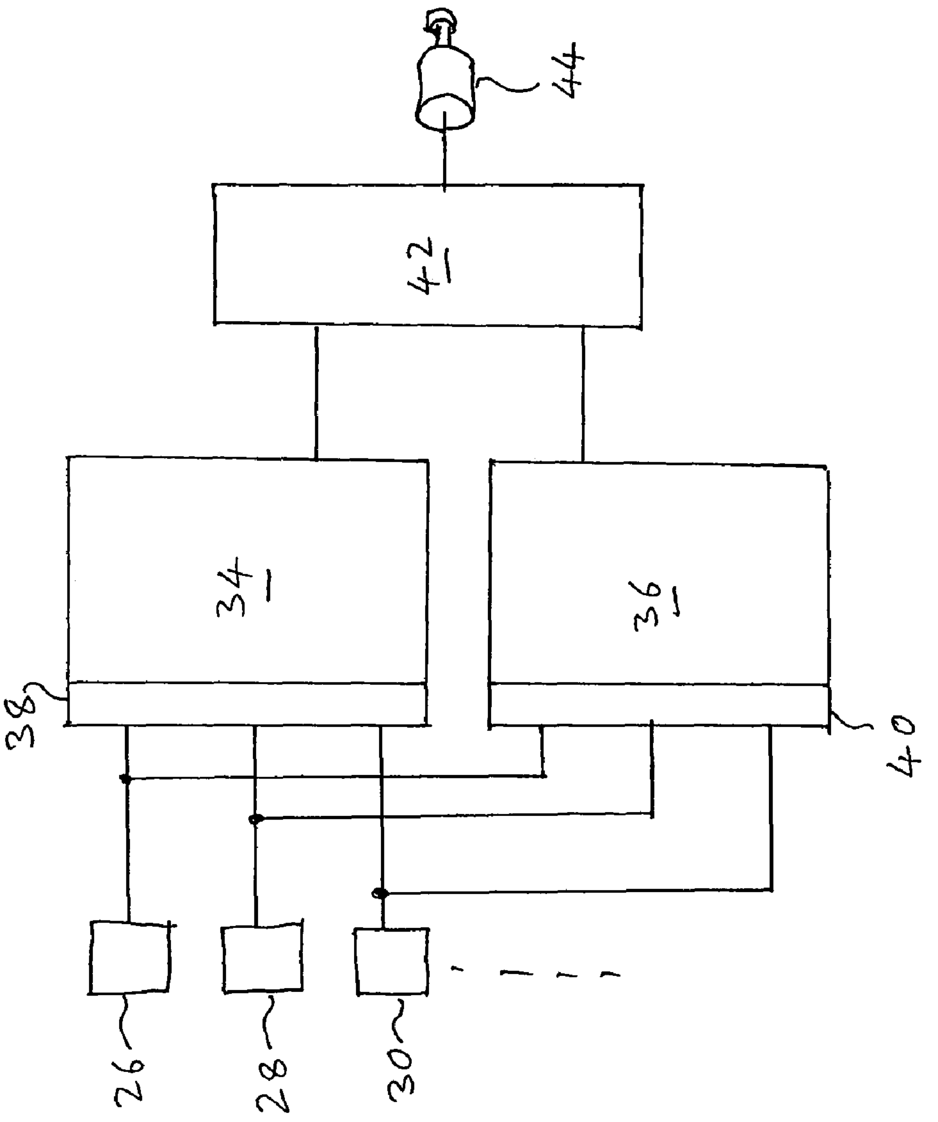
FIG. 6 shows a possible hardware implementation of the invention.

FIG. 6 shows a possible hardware implementation of the invention. Sensors 18 (26, 28, 30) are connected to a computer system comprising for example redundant computers 34, 36 via redundant interfaces 38, 40. The sensors may be directly wired to the interfaces or may be coupled via a preferably redundant data bus arrangement. Each computer 34, 36 contains its own software and performs tests on the input signals as described above. In addition the computers carry out pattern matching as described in more detail below.

The computers 34, 36 provide commands to a motor/brake controller 42 (which is the executer in FIG. 2) which is designed to control a motor and brake 44 such that the escalator can only be driven if both computers indicate that a safe condition exists. The redundancy in the computing contributes to the increase of the safety integrity of the computing itself.

Naturally a different number of sensors may be provided, and different events can be detected. In another embodiment there may be spaced-apart handrail sensors and there may be more than one chain speed sensor.

Figure 7:
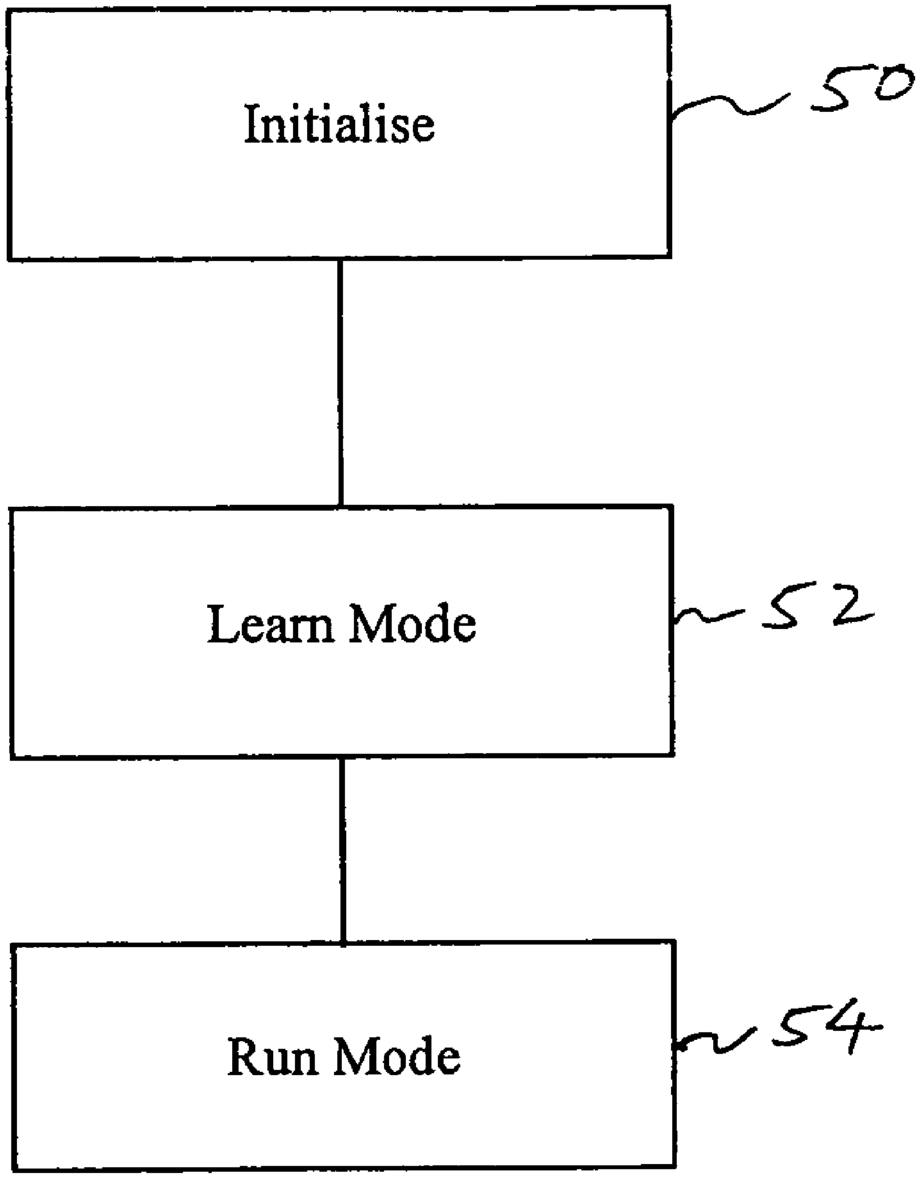
FIG. 7 shows a high level flowchart of a safety control process in accordance with the invention.

FIG. 7 is a high level flowchart of example programs executed in the computers 34, 36.

When the system is initialized at step 50, it first enters a testing and learning mode at step 52. During this time the escalator may be controlled to run without passengers for an inspection period such as one minute. In this period the proper relationship of the input signals is established, a number of kinematic tests are performed, and parameters of the relationships between the signals are established. For example, the computers can establish the existence of the output signals of the sensors and can confirm that similar sensors give similar outputs, and that the outputs of the step and handrail sensors are in relation to comply with a logic describing the model of an escalator or moving walkway including all the variants in gear ratios within the variant designs. By comparing the signals MSD1 with MSD2, SPEED1, SPEED2, HRS1 and HRS2, the integrity of the sensor pattern signal MSD1 can be established by the use of the logic described in the computer system. The same applies for MSD2, MSD1, SPEED1, SPEED2, HRS1 and HRS2 establishing the integrity of MSD2.

In the inspection period the proper relationship between various signals can be established, which verifies mechanical integrity, such as the proper functioning of gears. It verifies the proper and correct assembly and location of the sensors in the escalator or moving walkway. Exchange of sensor locations and faults in the sensor termination can be identified.

It may also be determined that the pulse rates are within an allowable absolute range such as defined in the physical pattern data.

During the learn mode combinations of sensor signals may be identified that may be used as reference patterns during the run mode.

During the inspection period the system can "learn" the sensor outputs assuming correct operation by a logic architecture/pattern stored in the computer system, and establish a range of allowable values for the outputs. These are referred to as allowable thresholds.

After the learn period has finished, the system enters a "run" mode at step 54. In this mode the system continually monitors the correct relationships between the input signals and verifies that they are correct. For example, on startup the system can check whether the acceleration of the handrail is equal to the acceleration of the steps. If this test fails it gives an indication of failure of the handrail drive. In addition the tests described above can be performed.

During normal speed running the sensor outputs can be checked against reference patterns indicating correct operation. For example, a pattern may be defined and tested for the relationship between two handrail signals, two step signals and one speed signal. A large number of possible patterns can be defined and tested, enabling the system to test for many possible fault conditions.

The timing characteristics of the signals are analyzed and parameters such as frequency, high-to-low ratio and phase shift are stored as definitions of the patterns.

Where appropriate, threshold values may be established to provide for allowable variations, such as in the speed of the escalator when heavily loaded. The system will then determine that the test has been passed when the relationship between the signals, or calculated values based thereon, does not deviate by more than the threshold value.

Figure 8:
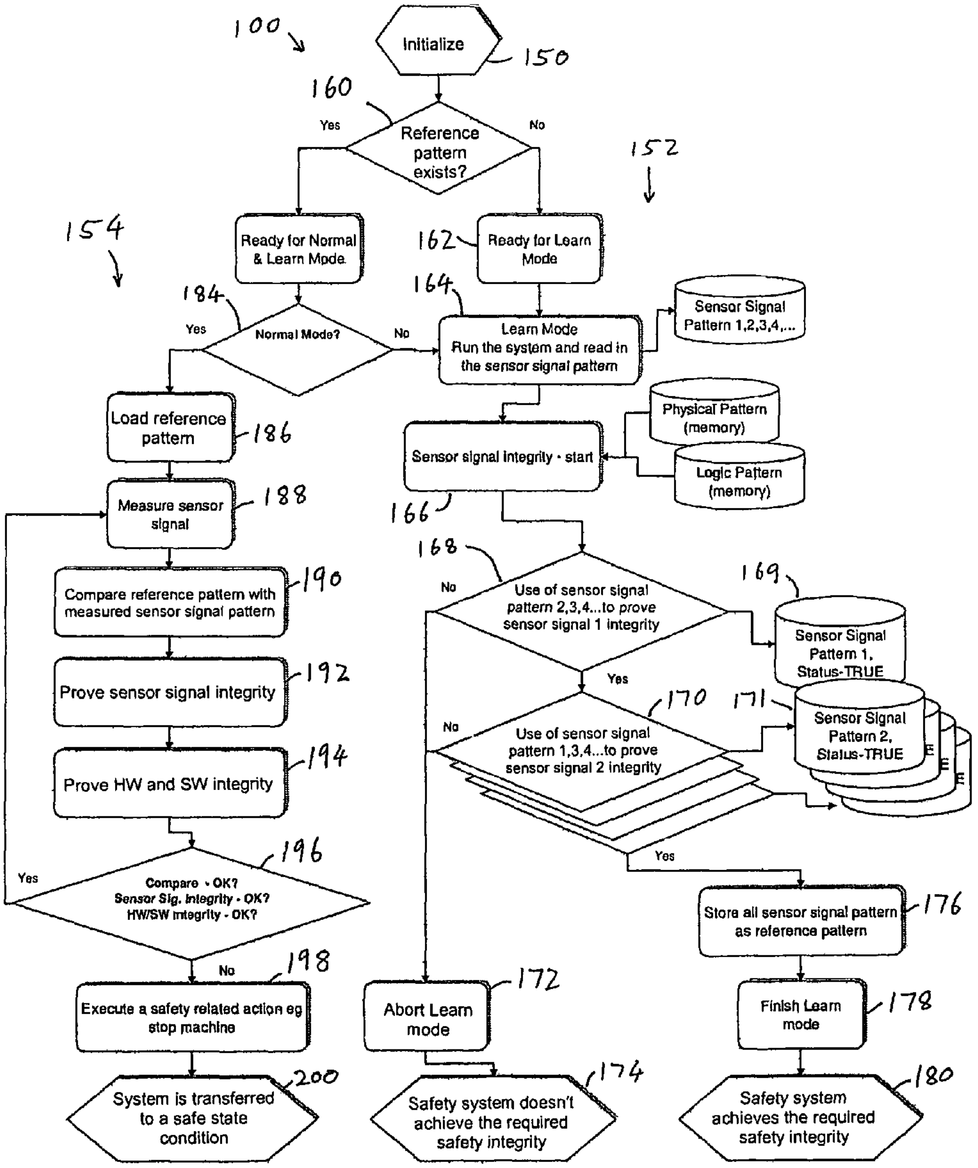
FIG. 8 is a more detailed flowchart.

FIG. 8 is a more detailed flowchart of a possible process 100 to be carried out in the computer system.

In general terms the process establishes sensor signal integrity and stores reference patterns showing integrity, and continuously proves sensor signal integrity and hardware and software integrity based on input information, namely the sensor signal pattern received from the physical system, a physical pattern pre-stored in the computer system and a logic pattern pre-stored in the computer system.

An initialization step is indicated at 150, a learn mode is generally indicated at 152, and a normal or run mode at 154.

After initialization, the process determines at step 160 whether a reference sensor signal pattern exists. If not, the learn mode is entered at step 162. In this mode the conveyor is run and the system reads in and stores the sensor signal pattern at step 164. The sensor signal pattern described the real measured information about the physical hardware system, such as the escalator or moving walkway.

The process then establishes the sensor signal integrity starting at step 166. For this process the system uses a pre-stored physical pattern and logic pattern.

The physical pattern describes the limits of the physical parameters of the product variants that the safety system shall be applied to. These might be speed values, such as 0.2-0.9 m/s; a gear ratio, such as 0.9-1.1; physical tolerances; and safety integrity requirements for each sensor signal.

The logic pattern describes the limits of physical parameter combinations, e.g. a step of length 400 mm shall not move faster than 0.75 m/s; handrail speed shall be in the range of 0-2% more than the step speed; and various IF . . . THEN . . . rules relating the measured parameters of the components.

The integrity of one of the sensor signals, such as MSD1, can then be established at step 168 using the other sensor signal patterns and the pre-stored physical and logic patterns. If the safety integrity of the first sensor signal is established, this is stored at step 169. Similarly, the safety integrity of each other sensor signal can be proved at steps 170 using the other signal patterns and the physical and logic patterns, and the successful results stored at steps 171.

Should any sensor signal fail its integrity test, the learn mode is aborted at step 172 and a message is output at step 174 to a user interface with related information for action by an authorized person.

Should all the sensor signals pass the integrity test, then all the sensor signal patterns (with status TRUE in steps 169 and 171) are stored at step 176 as a reference pattern, the learn mode is finished at step 178, and a suitable indication is given at step 180.

The next time the process is operated, it is determined at step 160 that a reference pattern exists and so the system is ready for the normal mode.

The normal mode begins at step 186 by loading in the reference pattern which was stored at step 176. Then the sensor signals are input at step 188. At step 190 the measured sensor signal patterns are compared with the stored reference patterns, at step 192 the sensor signal integrities are proven, and at step 194 the hardware and software integrities are established as described above. If all the tests are passed, the process returns from step 196 to step 188 to read in fresh sensor signals.

Should at any time any of the tests fail at step 196, the process moves to step 198 to carry out an appropriate safety related action, such as stopping the machine, and an indication is given at step 200.

Naturally, the learn mode can be processed again at any time under the control of an authorized person, and this is performed by indicating at step 184 that the normal mode is not to be followed at the time, so the process proceeds to the learn mode at step 164.

One advantage of the present invention is that the safety system will easily adapt to different or modified installations, both by the learning mode and by programming new logic patterns, and can readily be amended to carry out new safety checks, often without the addition of any new hardware.

Using the techniques described it is possible to achieve a computer-implemented safety system with a sufficient safety integrity level, such as a SIL according to IEC 61508. Many further features can be provided by the use of computers which receive the outputs of multiple sensors, such as additional safety tests, and extensive monitoring and management functions.

Whilst various embodiments of the invention have been described, these are not intended to be limiting and it will be apparent to those skilled in the art that various modifications can be made without departing from the principles of the invention. Therefore the claims should be studied to determine the full scope of the invention.

The invention claimed is:

1. A method of controlling the safety function of a conveyor, comprising:

providing signals from a plurality of sensors disposed in relation to the conveyor to a computer system;

operating the conveyor in a learn mode;

during operation in the learn mode determining in the computer system the relationship between the sensor output signals and pre-stored logic in the computer system which describes the physical geometry of the possible conveyor types and permissible operating characteristics thereof and determining the relationship between the sensor output signals to establish the safety integrity of the sensors, and storing sensor signal patterns as a reference pattern; and subsequently operating the conveyor in a run mode in which safety functions are monitored; and during the run mode comparing in the computer system the pattern of sensor signals with the reference pattern and with the pre-stored logic so as to establish the safety integrity of the sensors, of the computer system and of the operation of the conveyor.

2. A method of controlling the safety function of a conveyor as claimed in claim 1, comprising during the run mode repeatedly comparing the pattern of sensor signals with the reference pattern and the pre-stored logic so as to monitor the safety integrity of the sensors, of the computer system and of the operation of the conveyor.

3. A method as claimed in claim 1, wherein during the learn mode each sensor signal pattern is compared with the others to ensure the required safety integrity of the sensor signal and of a processing unit of the computer system.

4. A method as claimed in claim 1, comprising establishing threshold values to provide for allowable variations for safe operation of the conveyor, and determining that a test has been passed when the relationship between the signals, or calculated values based thereon, do not deviate by more than the threshold value.

5. A method as claimed in claim 1, comprising performing a safety-related action if safety integrity is not established, when there is no sensor output that of itself indicates a failure condition.

6. A method as claimed in claim 1, wherein the conveyor is an escalator.

7. A method as claimed in claim 1, wherein there is at least one step sensor, at least one handrail sensor, and at least one speed sensor.

8. A method as claimed in claim 7, wherein there are at least two step sensors, at least two handrail sensors, and at least one speed sensor.

9. A method as claimed in claim 8, wherein based on the sequence of the outputs of the step sensors correlated with the output of the speed sensor a conclusion is made about the correct functioning of the step sensors.

10. A method as claimed in claim 7, wherein based on the sequence of the output of at least one step sensor correlated with the output of the speed sensor and handrail sensor a conclusion is made about the correct functioning of each sensor.

11. A method as claimed in claim 8, wherein based on the sequence of the outputs of the step sensors a conclusion is made about the direction of motion and the integrity of the direction identified.

12. A method as claimed in claim 7, wherein based on the signal outputs of the step sensor a conclusion is made about the existence of steps.

13. A method as claimed in claim 8, wherein based on the correlation of the output of the speed sensor and the time relation of the outputs of the step sensors a conclusion is made on the lengthening and reduction of the step chain of the escalator.

14. A method as claimed in claim 7, wherein based on sensor speed information overspeed in the conveyor is detected.

15. A method as claimed in claim 7, wherein a difference in step speed and handrail speed can be detected and further safety actions can be taken.

* * * * *